United States Patent [19]

Tückmantel

[11] Patent Number: 4,892,320
[45] Date of Patent: Jan. 9, 1990

[54] STUFFING BOX ASSEMBLY

[75] Inventor: Hans-Joachim Tückmantel, Mülheim/Ruhr, Fed. Rep. of Germany

[73] Assignee: Kempchen & Co. GmbH, Oberhausen, Fed. Rep. of Germany

[21] Appl. No.: 215,019

[22] Filed: Jul. 5, 1988

[30] Foreign Application Priority Data

Jul. 3, 1987 [DE] Fed. Rep. of Germany ....... 3721967

[51] Int. Cl.[4] .................. F16J 15/28; F16J 15/30; F16K 41/02
[52] U.S. Cl. .................... 277/125; 251/214; 277/105; 277/187; 277/188 R; 277/204; 277/213; 277/235 R; 277/DIG. 6
[58] Field of Search ............. 277/102, 105, 110, 123, 277/125, 235 R, 213, 204, DIG. 6, 187, 188 R; 251/214

[56] References Cited

U.S. PATENT DOCUMENTS

| 1,543,963 | 6/1925 | Walton | 277/204 X |
| 2,188,664 | 1/1940 | Mochel | 277/125 |
| 2,251,211 | 7/1941 | Armstrong | 277/213 |
| 3,761,055 | 9/1973 | Ebuchi et al. | 277/125 X |
| 4,068,853 | 1/1978 | Schnitzler | 277/204 X |
| 4,090,719 | 5/1978 | Simanskis et al. | 277/125 |
| 4,214,761 | 7/1980 | Pippert | 277/204 X |
| 4,280,709 | 7/1981 | Heikes, Jr. et al. | 277/204 X |
| 4,305,567 | 12/1981 | Lunt | 277/204 X |
| 4,394,023 | 7/1983 | Hinojosa | 277/125 X |

Primary Examiner—Allan N. Shoap
Attorney, Agent, or Firm—Herbert Dubno

[57] ABSTRACT

A stuffing box especially for a high pressure steam valve has a plurality of packing rings including at least one laminate ring flanking a coiled graphite pressed ring, the laminate ring consisting of a stack of pressed expanded graphite foil annular disks between which and flanking which stainless steel metal foil layers can be provided.

20 Claims, 1 Drawing Sheet

STUFFING BOX ASSEMBLY

FIELD OF THE INVENTION

My present invention relates to a stuffing box seal assembly of the type which comprises a stuffing box housing having a chamber opening at a surface of the housing through which a stem, shaft or rod, hereinafter referred to as a spindle, can extend, a compressible seal within the chamber surrounding the spindle and a packing gland which is connected to the housing so as to exert an axial compressive force upon the seal.

BACKGROUND OF THE INVENTION

Stuffing boxes for the purposes described are provided to allow relative movement of the spindle and the housing while maintaining an effective seal therebetween.

The seal within the chamber, also referred to as a packing, generally comprises a plurality of packing rings which, upon the application of axial pressure, bear radially upon the spindle and the housing wall defining the chamber to maintain sealing effectiveness in spite of the movement of the spindle.

The rings can include a base ring and a cover ring flanking a coiled graphite pressed ring.

It will be understood that the gland in the mounted state of the assembly applies pressure in the axial direction to the packing rings which is sufficiently strong to cause the packing rings to bear against the movable shaft or stem and to sealingly lie against the housing. A coiled graphite pressed ring will be understood to refer to a pressed packing ring of special construction. It can comprise a strip of expanded graphite with a metal strip inserted between the turns of the spiral.

This composite ring structure when inserted in the housing chamber, can be compressed in the axial direction to deform the strips in accordance with statistical laws into a more or less corrugated or zigzag conformation as seen in section in a plane parallel to the axis of the assembly.

Packings of this type have been found to be suitable for the valve spindles of high pressure valves and, especially high pressure steam valves. However, some leakage can occur when the intrinsic strength of the material of the coiled graphite pressed ring is less than the stresses which arise on actuation of the valve spindle because of adhesion forces transmitted to this ring.

Such adhesion forces depend upon the surface qualities of the valve spindle and can be very pronounced when the valve spindle is only actuated from time to time or when the surface quality of the valve spindle does not meet specifications. It is possible in such cases, upon movement of the valve spindle that pieces of the coiled graphite pressed ring will be torn away from it and bring about leakage or the like. Indeed, in high pressure applications, such packings under those conditions may "blowout". This cannot be prevented by braided or other conventional cover or base rings.

OBJECTS OF THE INVENTION

It is the principal object of my present invention to provide a stuffing box assembly which is free from the disadvantages set forth above.

Another object of the present invention is to provide an improved stuffing box assembly in which blowout of the packing can be prevented.

SUMMARY OF THE INVENTION

These objects and others which will become more apparent hereinafter are attained, in accordance with the invention, by providing one of the packing rings, i.e. either the base ring or the cover ring, as a laminate ring consisting of a stack of annular disks composed of a pressed foil of expanded graphite and preferably by including between these annular disks, intervening metal foil rings. The laminate ring can have upper and/or lower metal foil rings at opposite axial sides of the laminate ring and, while the laminate ring may be either the cover or bottom ring, in a preferred embodiment, both the cover and the bottom ring may be constituted as such laminate rings.

Thus the stuffing box assembly of the invention can comprise a seal housing formed with a seal chamber opening at a surface of the housing and surrounding a spindle movable relative to the housing; a packing gland surrounding the spindle and tightenable against the housing; and a seal in the chamber under compression from the gland, the seal comprising a coiled graphite pressed ring in the chamber and including a spirally coiled strip of expanded graphite having turns interleaved with a metal strip extending around the spindle and under axial compression, and at least one laminate ring on an axial side of the coiled graphite pressed ring, the laminate ring comprising a plurality of stacked annular disk layers of expanded graphite extending generally transversely to an axis of the spindle and axially pressed together and limiting adhesion of material from the coiled graphite pressed ring to the spindle upon movement thereof relative to the housing.

The stuffing box of the invention can have a plurality of packings including the coil graphite pressed ring and at least one laminate ring in any combination. In the present embodiment, however, two such laminate rings flank the coiled graphite pressed rings and the laminate rings may, however, be provided and the rings of the packing can be joined in a single replaceable unit by, for example, adhesives.

Most advantageously, the system is used as a stuffing box for a valve spindle for a high pressure steam valve.

The metal foils described, preferably are composed of stainless steel and, more specifically, austenitic chromium/nickel steel.

Sealing rings which consist of metal foils and coatings of expanded graphite on such metal foils are, of course, known in vastly different contexts from those of the invention. They may be employed, for example, as cylinder head seals and are not in the form of laminate rings themselves or in a context in which a laminate ring can be used.

The laminate ring of the invention appears to solve the problem of adhesion destruction of the coiled graphite pressed ring by acting as a stripper ring or the like preventing movement of materials from the coiled graphite pressed ring. Such stripper action even applies when metal foil layers are not disposed between the graphite layers stacked to form the laminate ring because of the higher pressure generated by the gland upon the stacked rings.

Another advantage of the present invention is that the laminate rings appear to contribute to a self-repair effect which allows a graphite material to fill any gap which may form upon movement of the spindle especially when the metal foil layers are provided as intervening layers and to flank the graphite layer stacks of the laminate ring. It appears that the foils function additionally as a labyrinth seal to augment the sealing effectiveness.

Blowout, therefore, cannot occur.

BRIEF DESCRIPTION OF THE DRAWINGS

The above objects, features and advantages of my invention will become more readily apparent from the following description, reference being made to the accompanying drawing in which.

SPECIFIC DESCRIPTION

Figure 1:
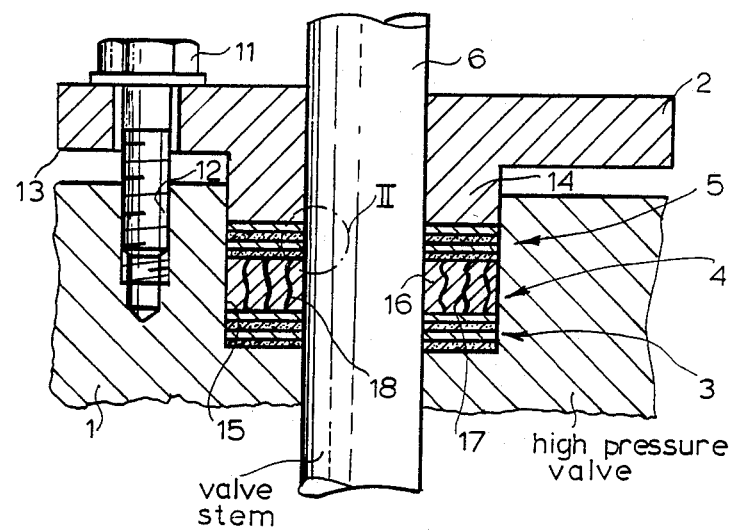
FIG. 1 is an axial section through a stuffing box assembly according to the invention.

In the drawing, I have shown a stuffing box assembly which comprises a housing 1 which can be the housing of a high pressure steam valve having a stem 6 also referred to hereinafter as a spindle which can move relative to the housing, e.g. can rotate.

Packing gland 2 can be forced toward the housing 1 by the tightening of screws 11 passing through the flange 13 of the gland 2 to engage in threaded bores 12 of the housing. A plug portion 14 of the gland compresses a packing 3, 4, 5 in a chamber 15 of the housing so that the packing is pressed against the spindle 6 and the housing wall defining the chamber.

The packing comprises packing rings 3, 4 and 5 which sealingly bear upon the spindle 6 and the housing 1 and which are forced against one another by the compressive force of the gland 2.

The intermediate packing ring 4 is a coiled graphite pressed ring which consists of a spiral coil 16 of pressed graphite and a metal foil strip 17 of stainless steel, e.g. austenitic chromium/nickel stainless steel. The compressive force is such that corrugations 17 may be formed in the ring. The height of this ring is relatively large.

Figure 2:
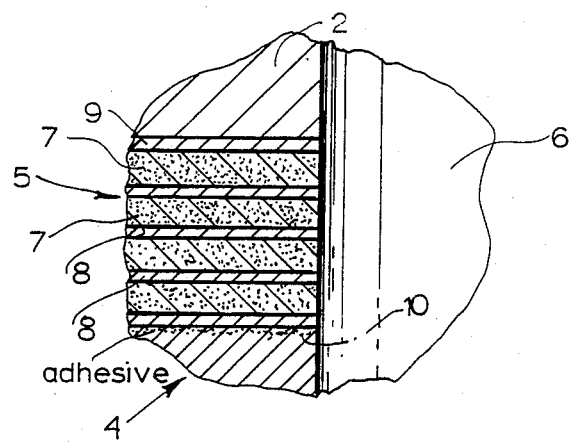
FIG. 2 is an enlarged cross-sectional view of the region II of FIG. 1.

The base ring 3 and the cover ring 4 are preferably laminate rings having a construction as shown in FIG. 2.

As can be seen from FIG. 2, each of the laminate rings 3 and 5 can comprise a stack of annular disks 7 pressed from a foil of expanded graphite. Below these annular disks intervening metal layers 8 of stainless steel foil, also of chromium/nickel austenitic stainless steel are provided. Furthermore, on each axial side of each laminate ring cover foil rings 9 of this stainless steel are likewise provided. The disks and rings are joined together by adhesive coatings one of which has been represented at 10 so that the packing 3, 4, 5 forms a single unit.

When the packing consists of more than three packing rings, laminate rings can be provided at various locations. For example, if two coiled pressed rings are provided, a laminate ring can be additionally located between them or only two such laminate rings can flank the entire assembly.

The system has been found to be highly advantageous for high pressure steam valves in providing sealing and blowout protection thereto.

I claim:

1. A stuffing box seal assembly, comprising:
   a seal housing formed with a seal chamber opening at a surface of said housing and surrounding a spindle movable relative to said housing;
   a packing gland surrounding said spindle and tightenable against said housing; and
   a seal in said chamber under compression from said gland, said seal comprising:
   a coiled graphite pressed ring in said chamber and including a spirally coiled strip of expanded graphite having turns interleaved with a metal strip extending around said spindle and under axial compression, and
   at least one laminate ring on an axial side of said coiled graphite pressed ring, said laminate ring comprising a plurality of stacked annular disk layers of expanded graphite extending generally transversely to an axis 7 of said spindle and axially pressed toward each other and limiting adhesion of material from said coiled graphite pressed ring to said spindle upon movement thereof relative to said housing.

2. The stuffing box seal assembly defined in claim 1 wherein said laminate ring includes a plurality of annular metal-foil intervening layers between said annular disk layers of expanded graphite.

3. The stuffing box seal assembly defined in claim 2 wherein said annular metal-foil intervening layers are composed of a corrosion-resistant metal.

4. The stuffing box seal assembly defined in claim 3 wherein said corrosion-resistant metal is a stainless steel.

5. The stuffing box seal assembly defined in claim 4 wherein said stainless steel is an austenitic chromium/nickel steel.

6. The stuffing box seal assembly defined in claim 2, further comprising an annular metal-foil layer on at least one axial end of the stack of said annular disk layers of expanded graphite.

7. The stuffing box seal assembly defined in claim 2, further comprising a respective annular metal-foil layer on each axial end of the stack of said annular disk layers of expanded graphite.

8. The stuffing box seal assembly defined in claim 7 wherein said annular metal-foil intervening layers are composed of a corrosion-resistant metal.

9. The stuffing box seal assembly defined in claim 8 wherein said corrosion-resistant metal is a stainless steel.

10. The stuffing box seal assembly defined in claim 9 wherein said stainless steel is an austenitic chromium/nickel steel.

11. The stuffing box seal assembly defined in claim 1, further comprising another said laminate ring in said chamber on an opposite axial side of said coiled graphite pressed ring and comprising a plurality of stacked annular disk layers of expanded graphite extending generally transversely to said axis of said spindle and axially pressed toward each other.

12. The stuffing box seal assembly defined in claim 11 wherein each of said laminate rings includes a plurality of annular metal-foil intervening layers between the respective annular disk layers of expanded graphite.

13. The stuffing box seal assembly defined in claim 12 wherein said annular metal-foil intervening layers are composed of a corrosion-resistant metal.

14. The stuffing box seal assembly defined in claim 13 wherein said corrosion-resistant metal is a stainless steel.

15. The stuffing box seal assembly defined in claim 14 wherein said stainless steel is an austenitic chromium/nickel steel.

16. The stuffing box seal assembly defined in claim 11 wherein said rings are joined together to form a unit.

17. The stuffing box seal assembly defined in claim 2 wherein said rings are joined together to form a unit.

18. The stuffing box seal assembly defined in claim 1 wherein said housing is a valve housing for a high-pressure steam valve and said spindle is a valve spindle for said valve.

19. A stuffing box seal assembly, comprising:
- a seal housing formed around at least part of a high-pressure steam valve and having a seal chamber opening at a surface of said housing and surrounding a spindle of the valve movable relative to said housing;
- a packing gland surrounding said spindle and tightenable against said housing; and
- a seal in said chamber under compression from said gland, said seal comprising:
  - a coiled graphite pressed ring in said chamber and including a spirally coiled strip of expanded graphite having turns interleaved with a metal strip extending around said spindle and under axial compression, and
  - respective laminate rings on opposite axial sides of said coiled graphite pressed ring and bonded thereto to form a unit therewith, said laminate rings each comprising:
- a plurality of stacked annular disk layers of expanded graphite extending generally transversely to an axis of said spindle and axially pressed toward each other and limiting adhesion of material from said coiled graphite pressed ring to said spindle upon movement thereof relative to said housing,
- a plurality of respective annular metal-foil intervening layers between said annular disk layers of expanded graphite of each laminate ring, and
- respective cover and base annular metal-foil layers flanking each of said stacks.

20. The stuffing box seal assembly defined in claim 19 wherein said annular metal-foil layers are composed of stainless steel.

* * * * *